US012789803B2

(12) United States Patent
Samsioe et al.

(10) Patent No.: US 12,789,803 B2
(45) Date of Patent: Nov. 10, 2026

(54) METHOD FOR CONTROLLING A VEHICLE

(71) Applicant: Volvo Truck Corporation, Gothenburg (SE)

(72) Inventors: Jens Samsioe, Gothenburg (SE); Linus Nordholm, Gothenburg (SE); Johan Bjernetun, Mölnlycke (SE); Johan Lindberg, Gothenburg (SE); Anders Magnusson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 180 days.

(21) Appl. No.: 18/558,413

(22) PCT Filed: May 10, 2021

(86) PCT No.: PCT/EP2021/062345
§ 371 (c)(1),
(2) Date: Nov. 1, 2023

(87) PCT Pub. No.: WO2022/237956
PCT Pub. Date: Nov. 17, 2022

(65) Prior Publication Data

US 2024/0227799 A1 Jul. 11, 2024

(51) Int. Cl.

*B60W 30/14* (2006.01)
*B60W 50/00* (2006.01)
*B60W 50/10* (2012.01)

(52) U.S. Cl.

CPC ...... *B60W 30/146* (2013.01); *B60W 50/0098* (2013.01); *B60W 50/10* (2013.01);
(Continued)

(58) Field of Classification Search

CPC ........... B60W 30/146; B60W 50/0098; B60W 50/10; B60W 2300/125; B60W 2520/10; B60W 2720/103
See application file for complete search history.

(56) References Cited

U.S. PATENT DOCUMENTS 8,996,273 B2 * 3/2015 Lee .......................... G01S 19/49 701/96
2014/0277835 A1 9/2014 Filev et al.
(Continued)

FOREIGN PATENT DOCUMENTS

SE 539309 C2 6/2017
WO 2016186560 A1 11/2016

OTHER PUBLICATIONS

International Search Report and Written Opinion for International Patent Application No. PCT/EP2021/062345, mailed Jan. 27, 2022, 16 pages.

(Continued)

*Primary Examiner* — Mohamad O El Sayah
(74) *Attorney, Agent, or Firm* — Withrow & Terranova, PLLC

(57) ABSTRACT

A method for controlling a vehicle, the method comprising obtaining route data representing information about a portion of a route to be travelled by the subject vehicle and determining an efficient speed of the subject vehicle at a position along the route portion, in dependence on the route data, on a cost of operating the subject vehicle along the route portion, and on a progress of the subject vehicle along the route portion, comprising determining, independently of the step of determining an efficient speed, a maximum safe speed at the position along the route portion, in dependence on the route data, with an aim to avoid an accident involving the subject vehicle, wherein the maximum safe speed forms an upper limit of the subject vehicle speed at the position.

20 Claims, 7 Drawing Sheets

(52) U.S. Cl.
CPC ... *B60W 2300/125* (2013.01); *B60W 2520/10* (2013.01); *B60W 2720/103* (2013.01)

(56) References Cited

U.S. PATENT DOCUMENTS

| | | | | |
|---|---|---|---|---|
| 2014/0297182 | A1 | 10/2014 | Casson et al. | |
| 2019/0054925 | A1 | 2/2019 | Froeschl et al. | |
| 2019/0276018 | A1* | 9/2019 | Kim | B60W 30/16 |
| 2019/0375407 | A1* | 12/2019 | Maleki | B60W 10/04 |
| 2020/0130703 | A1* | 4/2020 | Pendelton | B60W 40/09 |
| 2022/0171398 | A1* | 6/2022 | Grossman | B60W 60/0021 |

OTHER PUBLICATIONS

International Preliminary Report on Patentability for International Patent Application No. PCT/EP2021/062345, mailed Aug. 30, 2023, 48 pages.

* cited by examiner

METHOD FOR CONTROLLING A VEHICLE

This application is a 35 USC 371 national phase filing of International Application No. PCT/EP2021/062345, filed May 10, 2021, the disclosure of which is incorporated herein by reference in its entirety.

TECHNICAL FIELD

The invention relates to a method for controlling a vehicle, a computer program, or a group of computer programs, a computer readable medium, a control unit, and a vehicle.

The invention can be applied to heavy-duty vehicles, such as trucks and buses. Although the invention will be described with respect to trucks, the invention is not restricted to this particular type of vehicle, but may also be used in other vehicle types such as delivery vans and cars.

BACKGROUND

Increasing the productivity, while keeping operating costs as low as possible, is an aim of many vehicle operations, in particular commercial vehicle operations.

US2019054925 describes an operating strategy profile for a vehicle, matched to a section of the driving route ahead of the vehicle. It is suggested that the operating strategy profile is selected on the basis of a selection criterion, and the selection criterion is based on the optimization of energy consumption of the vehicle, power of the vehicle, comfort of vehicle occupants, vehicle safety, and/or a cost function.

However, there is a desire to increase the efficiency of controlling a vehicle.

SUMMARY

It is an object of the invention to increase the efficiency of controlling a vehicle.

The object is reached with a method. Thus, the object is reached by a method for controlling a subject vehicle, the method comprising

- obtaining route data representing information about a portion of a route to be travelled by the subject vehicle, and
- determining an efficient speed of the subject vehicle at a position along the route portion, in dependence on the route data, on a cost of operating the subject vehicle along the route portion, and on a progress of the subject vehicle along the route portion,
- the method further comprising determining, independently of the step of determining an efficient speed, a maximum safe speed at said position along the route portion, in dependence on the route data, with an aim to avoid an accident involving the subject vehicle,
- wherein the maximum safe speed forms an upper limit of the subject vehicle speed at said position.

Thus, for said position along the route portion, an efficient speed, as well as a maximum safe speed are determined. The step of determining an efficient speed may involve predicting an efficient speed at said position. The step of determining a maximum safe speed may involve predicting an efficient speed at said position.

The route data may include data representing information about curvatures, and/or inclinations of the route portion. The route portion may be a portion of a road travelled by the subject vehicle. The route portion may extend from the vehicle to a position on the route ahead of the vehicle. As the vehicle moved along the route, the route portion may move with the vehicle. The route data may be dependent on map data.

Determining the efficient speed may involve predicting the cost of operating the subject vehicle along the route portion. Thus, the cost of operating the subject vehicle, in dependence of which the efficient speed is determined, may be an anticipated cost. The cost of operating the subject vehicle along the route portion may be dependent on one or more of fuel consumption, electrical energy consumption, battery degradation, and another degradation of the subject vehicle. The cost of operating the subject vehicle along the route portion may be based on a cost of operating the vehicle along the route, e.g. to an end destination of the subject vehicle.

Determining the efficient speed may involve predicting the progress of the subject vehicle along the route portion. Thus, the progress of the subject vehicle, in dependence of which the efficient speed is determined, may be an anticipated progress. The progress of the subject vehicle along the route portion may be dependent on the time consumed by the subject vehicle travelling through the route portion. The cost of operating the subject vehicle along the route portion may be based on a cost of operating the vehicle along the route, e.g. to an end destination of the subject vehicle.

The method may comprise obtaining vehicle data representing information about the subject vehicle. Such data, e.g. vehicle mass, current load, gross weight, center of gravity, vehicle powertrain characteristics, braking capabilities, and/or steering characteristics, may be included in a mathematical model of the subject vehicle. The efficient speed and/or the maximum safe speed at said position may be determined in dependence on the vehicle data.

The maximum safe speed at said position is determined with an aim to avoid an accident involving the subject vehicle. For example, where said position is in a curve of the route portion, the maximum safe speed may be a speed over which the subject vehicle overturns.

Thereby, a roll-over accident may occur. For determining the speed at which the subject vehicle overturns, a mathematical vehicle model may be used. The maximum safe speed may be determined based on capabilities of the subject vehicle. The maximum safe speed may be dependent on the subject vehicle configuration, braking capabilities, current load, gross weight, center of gravity, steering characteristics, and/or road friction. Data on the center of gravity may include a longitudinal centre of gravity position, and/or a vertical centre of gravity position.

The maximum safe speed forms an upper limit of the subject vehicle speed at said position. Thus, if the efficient speed at said position is determined to be higher than the maximum safe speed, the subject vehicle will be controlled so as to be controlled at a speed which is lower than the efficient speed. However, in some embodiments, the efficient speed may be determined in dependence on the maximum safe speed. Thereby, the maximum safe speed may form a boundary condition for the efficient speed determination. Nevertheless, the maximum safe speed is determined independently of the efficient speed determination.

The method may be computer implemented, e.g. in a control unit of the subject vehicle. Thereby, the determination of the maximum safe speed, independently of the determination of the efficient speed, provides significant advantages.

As suggested below, the determination of the maximum safe speed may be repeated a plurality of times as the vehicle approaches said position. Thereby, changing environmental data, e.g. caused by an action of another vehicle on the route portion, may be considered for a change of the maximum safe speed. By the independent determination of the maximum safe speed, such repeats and adjustments may be made without involving factors which are relevant to the determination of the efficient speed, but less relevant to the maximum safe speed, such as the cost of operation, and the progress of the vehicle. Thereby, adjustments in view of changes in the environment, e.g. in the surrounding traffic situation, may be determined with a relatively small amount of use of a processor in a control unit for performing the method. Thereby, a decreased processing time for the adjustments, and/or a reduced processor capacity, is allowed.

The invention allows for the safe maximum speed to be updated in view of a changing environment, while the efficient speed determination is left unamended. A change in the environment, e.g. in a surrounding traffic situation, requiring a change of the maximum safe speed, may be temporary, and the efficient speed determination may be ignored, since due to the transient nature of the environment change, the effect thereof on the efficiency of the vehicle operation may be negligeable.

The determination of the efficient speed may be repeated a plurality of times as the vehicle approaches said position. In such embodiments, the independent determination of the maximum safe speed, allows for the maximum safe speed determination to be repeated with a period, or cycle time, which is different from the period of the repeat of the efficient speed determination. Preferably, the period for repeated maximum safe speed determinations is shorter than the period for repeated efficient speed determinations.

The invention allows for the efficient speed determination, with a relatively large amount of calculations, to be repeated with a relatively long cycle time, while safety critical calculations of the maximum safe speed determination are repeated with a relative short cycle time. Thereby, over time, the calculations for the repeated efficient speed determinations may on average be relatively low, which reduces processor capacity requirements.

As suggested below, the efficient speed may be included in an efficient speed profile, and the maximum safe speed may be included in a maximum safe speed profile. Thereby, the independent determination of the maximum safe speed allows for a horizon of the maximum safe speed profile to be different from a horizon of the efficient speed profile. Preferably, the horizon of the maximum safe speed profile is shorter than the horizon of the efficient speed profile. Thereby, processing time, and/or processor capacity for the maximum safe speed profile determination may be kept relatively low, while the efficiency of the vehicle operation may be optimized over a relatively long part of, or the remainder of, the route. Thereby, the efficiency of the vehicle control is increased.

The computer programming for the efficient speed determination will likely be complex. For example, the efficient speed determination may utilize a mathematical model of the subject vehicle with a relatively large number of parameters linked to each other in a non-linear manner. However, the efficient speed determination may be less critical than the maximum safe speed determination. Therefore, the efficient speed determination may be done by use of a hardware unit which is simpler, less costly, and more easily available, than a hardware unit used for the maximum safe speed determination. Such a separation also allows for more flexibility in the setup of the efficient speed determination. For example, the efficient speed determination may be done onboard the subject vehicle, or remotely from the subject vehicle, whereby the determined efficient speed is communicated to the vehicle wirelessly. Thereby, the maximum safe speed determination may be done onboard the subject vehicle.

Also, certain updates, e.g. regarding changes in the subject vehicle, may be made subject of updates in a computer function for the maximum safe speed determination, but not in a computer function for the efficient speed determination. Thereby, the process of updating the control unit programming may be significantly simplified. Thereby, the efficiency of the vehicle control is increased.

The efficient speed at said position may be determined by a calculation of the efficient speed at said position, or by interpolation from calculations of the efficient speed at a plurality of other positions along the route portion. For example, where, as suggested below, the method comprises determining an efficient speed profile, the profile may be given by interpolation of a discrete set of efficient speed values at respective positions along the route.

Similarly, the maximum safe speed at said position may be determined by a calculation of the maximum safe speed at said position, or by interpolation from calculations of the maximum safe speed at a plurality of other positions along the route portion. For example, where, as suggested below, the method comprises determining a maximum safe speed profile, the profile may be given by interpolation of a discrete set of maximum safe speed values at respective positions along the route.

The method may be executed in various different contexts. For example, steps of determining an efficient speed and determining a maximum safe speed at said position, may be carried out in response to a request for a subject vehicle powertrain torque, or a subject vehicle speed. Such a request may originate from a human vehicle driver maneuvering device, such as a throttle pedal, or from an autonomous vehicle control function. The efficient speed or the maximum safe speed determined in embodiments of the method may be used to control the subject vehicle. For example, a powertrain torque request may be made in dependence on the efficient speed, or the maximum safe speed. In some embodiments, the efficient speed or the maximum safe speed may adjust a request from a function in the subject vehicle, e.g. provided by a driver maneuvering device. Such an adjustment may be done by overriding the request, and/or informing the driver that the efficient speed or the maximum safe speed is, or will be, violated.

In some embodiments, the steps of determining an efficient speed and determining a maximum safe speed are performed by the use of separate respective hardware units, or by the use of separate respective software modules. Thereby, the independent determination of the maximum safe speed may be secured. The software modules may be provided by one or more partitions, e.g. in a data storage unit. Each of the software modules may be a separate, and individually interchangeable piece of software. The efficient speed determination and the maximum safe speed determination may be determined by different software applications. The software applications may be programmed into a control unit in the form of a single hardware unit. Thereby, delays and bandwidth limitations in communication between hardware units may be avoided. Nevertheless, the maximum safe speed determination may be done by a safety-classified software, and the efficient speed determination may be done by a non-safety-classified software. These pieces of software may be provided in different software modules of the hardware unit.

In some embodiments, the maximum safe speed is determined in dependence on environment data, including data representative of one or more additional vehicles on the route portion, and/or data representative of terrain and/or one or more structures at the route portion. Thereby, the boundary condition provided by the maximum safe speed determination may take into account such environmental data. Thereby, the environment data may be used to increase the safety related to the operation of the subject vehicle. For example, where said position is where terrain and/or one or more structures at the route portion causes a blind curve, i.e. a curve with a limited view to any vehicle passing though it, the maximum safe speed may be determined so that the subject vehicle will avoid colliding with another vehicle travelling slowly through, or being stationary in, the blind curve.

The data representative of one or more additional vehicles on the route portion may form surrounding traffic data. The one or more additional vehicles may be in operation, or parked. Operating vehicles may move, or be stationary. The maximum safe speed at said position may be determined in dependence on critical distances to one or more additional vehicles. The surrounding traffic data may include data on traffic at a traffic light system, and/or data indicative of another vehicle in front of the subject vehicle slowing down.

The data representative of terrain and/or one or more structures may be in the vicinity of the route portion. Thereby, the terrain and/or one or more structures, e.g. buildings, may be detectable by one or more sensors of the subject vehicle. The one or more sensors may be one or more cameras, one or more lidar sensors, and/or one or more radar sensors.

In some embodiments, the maximum safe speed may be determined in dependence on environment data, including data indicative of the weather, and/or a condition of the route portion. Such data may be provided to the subject vehicle by wireless communication from a remote source, e.g. another vehicle, e.g. by vehicle-to-vehicle communication.

Preferably, the step of determining a maximum safe speed at said position is repeated as the subject vehicle moves along the route. Particularly, step of determining a maximum safe speed at said position may be repeated as the subject vehicle approaches said position. Thereby, the maximum safe speed determination may be repetitively updated, e.g. in view of changing environmental data. As described below, the method may comprise determining a maximum safe speed profile, including the maximum safe speed, along the route portion. The determination of the maximum safe speed profile may be repeated as the subject vehicle moves along the route. Thereby, the maximum safe speed profile may be adjusted to changing environmental data. For example, the maximum safe speed determination at said position may be adjusted in case of another vehicle in front of the subject vehicle braking.

In some embodiments, the step of determining an efficient speed at said position is repeated as the subject vehicle moves along the route. Thereby, the maximum safe speed determination may be repeated more often than the efficient speed determination. The maximum safe speed determination may be repeated every 1-500 ms, e.g. every 10 ms.

Preferably, the method comprises determining, independently of the step of determining an efficient speed, a minimum safe speed at said position along the route portion, in dependence on the route data, with an aim to avoid an accident involving the subject vehicle, wherein the minimum safe speed forms a lower limit of the subject vehicle speed at said position. Thereby, a lower boundary for the efficient speed may be provided. Thereby, the method may assure that accidents caused by a low speed of the subject vehicle, such as a rear-end collision, is avoided. For example, a rear end collision may be caused by the subject vehicle travelling slowly through a blind curve, i.e. a curve with a limited view to any vehicle passing though it.

The minimum safe speed may, in addition to the route data, be dependent on vehicle data and/or environment data.

In some embodiments, the method comprises determining, independently of the step of determining an efficient speed, a maximum comfortable speed, and/or a minimum comfortable speed, at said position along the route portion, in dependence on the route data, with an aim to avoid discomfort for a driver and/or an occupant of the subject vehicle, wherein the maximum comfortable speed forms an upper limit of the subject vehicle speed at said position, and the minimum comfortable speed forms a lower limit of the subject vehicle speed at said position. The maximum comfortable speed as well as the minimum comfortable speed may be determined. Thereby step of determining a maximum comfortable speed, and a minimum comfortable speed, may be performed by respective partial steps. However, in some embodiments, the maximum comfortable speed, but not the minimum comfortable speed, is determined. In the embodiments, the minimum comfortable speed, but not the maximum comfortable speed, is determined.

The maximum comfortable speed, and/or the minimum comfortable speed, may be determined in dependence on the curvature of the road at said position, and/or on environmental data, such as data on surrounding traffic. The maximum comfortable speed, and/or the minimum comfortable speed, at said position may also be determined in dependence on data about the subject vehicle, e.g. as provided in a mathematical model of the subject vehicle.

Thereby, the maximum comfortable speed, and/or the minimum comfortable speed, as well as the maximum safe speed may form boundary conditions for the efficient speed at said position. Thereby, the method may propose a subject vehicle speed that optimizes the subject vehicle operation efficiency without compromising safety and comfort.

In a control unit for the subject vehicle, the maximum comfortable speed, and/or the minimum comfortable speed, may be determined by a software application that is separate from a software application determining the efficient speed. The efficient speed determination may be less critical than the maximum comfortable speed determination, and/or the minimum comfortable speed determination. Therefore, a hardware unit for the efficient speed determination may be simpler and cheaper than a hardware unit for the maximum and/or minimum comfortable speed determination. Also, certain updates, e.g. regarding changes in the subject vehicle, may be made subject of updates in a computer function for the maximum comfortable speed determination, and/or the minimum comfortable speed determination, but not in a computer function for the efficient speed determination. Thereby, the process of updating a vehicle control unit programming may be simplified.

The maximum comfortable speed may be a second boundary condition to the efficient speed, where the maximum safe speed is the first boundary condition. The maximum comfortable speed, and/or the minimum comfortable speed, may be determined in dependence on know-how and/or experience of a developer of the subject vehicle.

The method may comprise receiving interface data from a human machine interface device, representative of one or more requests from a driver and/or an occupant of the subject vehicle, wherein the maximum comfortable speed, and/or the minimum comfortable speed, is determined in dependence on the interface data. Thereby, the maximum comfortable speed, and/or the minimum comfortable speed, may be manipulated and/or changed by the driver and/or the occupant. The one or more requests may be provided in the form of a selection from a plurality of driving modes, which are programmed into a control unit of the subject vehicle. The one or more requests may comprise a requested cruising distance from another vehicle in front of the subject vehicle.

The maximum comfortable speed, and/or the minimum comfortable speed, may be determined in dependence on a request from a driver or an occupant of the subject vehicle. Such a request may be based on subjective impressions of such a person. For example, travelling relatively fast through a curve may cause such a person to experience unrest due to a worry that the vehicle will turn over. As another example, if travelling slowly through a blind curve, such a person may experience unrest due to a worry of the subject vehicle being hit from behind by another vehicle.

It may be assumed that subjective impressions affect the concentration of a driver of the subject vehicle, in turn affecting the alertness of the driver. Therefore, the maximum comfortable speed, as well as the minimum comfortable speed, may reduce the risk of safety hazards due to a reduced driver alertness.

The steps of determining an efficient speed and determining a maximum comfortable speed, and/or a minimum comfortable speed, may be performed by the use of separate respective hardware units, or by the use of separate software modules. Thereby, the independent determination of the maximum comfortable speed, and/or the minimum comfortable speed, may be secured. Software applications, each arranged to determine a respective of the efficient speed and the maximum comfortable speed, and/or the minimum comfortable speed, may be programmed into a control unit in the form of a single hardware unit. Thereby, delays and bandwidth limitations in communication between hardware units may be avoided.

Preferably, the maximum comfortable speed, and/or the minimum comfortable speed, is determined in dependence on environment data, including data representative of one or more additional vehicles on the route portion, and/or data representative of terrain and/or one or more structures at the route portion. Thereby, the boundary condition provided by the maximum comfortable speed determination, and/or the minimum comfortable speed determination, may take into account such environmental data. Thereby, the environment data may be used to increase the comfort of a driver and/or an occupant of the subject vehicle.

Preferably, the step of determining a maximum comfortable speed, and/or a minimum comfortable speed, is repeated as the subject vehicle moves along the route. Thereby, the maximum comfortable speed determination, and/or the minimum comfortable speed determination, may be repetitively updated, e.g. in view of changing environmental data. Particularly, step of determining a maximum comfortable speed, and/or a minimum comfortable speed, at said position may be repeated as the subject vehicle approaches said position.

In some embodiments, the method comprises determining, independently of the step of determining an efficient speed, a maximum legal speed at said position along the route portion, in dependence on the route data, wherein the maximum legal speed forms an upper limit of the subject vehicle speed at said position.

Preferably, the method comprises determining an efficient speed profile, including the efficient speed, of the subject vehicle along the route portion, in dependence on the route data, on a cost of operating the subject vehicle along the route portion, and on a progress of the subject vehicle along the route portion. The method may comprise determining a maximum safe speed profile, including the maximum safe speed, along the route portion, in dependence on the route data, with an aim to avoid an accident involving the subject vehicle. Thereby, the maximum safe speed profile may form an upper boundary of the subject vehicle speed along the route portion. Preferably, the maximum safe speed profile is determined independently of the step of determining an efficient speed profile.

The efficient speed profile may include speeds at respective positions along the route portion. Determining the efficient speed profile may comprise predicting the efficient speed profile. Similarly, the maximum safe speed profile may include speeds at respective positions along the route portion. Determining the maximum safe speed profile may comprise predicting the maximum safe speed profile.

Thereby, the independently determined boundary may be provided for a plurality of positions along the route portion. This facilitates the planning of the travel of the subject vehicle through the route portion.

In addition to route data, the efficient speed profile and/or the maximum safe speed profile may be determined in dependence of data about the subject vehicle, e.g. including a mathematical model of the subject vehicle.

The efficient speed profile may be determined for an efficient speed horizon of the vehicle. The efficient speed horizon may coincide with said route portion, or it may extend further, or less far, than said route portion. The maximum safe speed profile may be determined for a maximum safe speed horizon of the vehicle. The maximum safe speed horizon may coincide with said route portion, or it may extend further, or less far, than said route portion. The efficient speed profile may extend less far than the maximum safe speed horizon. However, preferably, the efficient speed profile extends further than the maximum safe speed horizon.

The determination of the efficient speed profile may be repeated as the vehicle moves along the route. Thereby, the efficient speed horizon may move along the route with the vehicle. Similarly, the determination of the maximum safe speed profile may be repeated as the vehicle moves along the route. Thereby, the maximum safe speed horizon may move along the route with the vehicle.

When the efficient speed profile determination is repeated, the route to be travelled by the subject vehicle may be adjusted. For example, it may be determined that another, new route portion, differing from the route portion based on which a previous efficient speed profile has been determined, should be travelled by the subject vehicle. There reason may be the subject vehicle receiving information about a traffic jam on the previous route portion. Thereby, a repeated maximum safe speed profile determination may be dependent on the new route portion.

Embodiments of the method comprises determining a maximum comfortable speed profile, and/or a minimum comfortable speed profile along the route portion, in dependence on the route data, with an aim to avoid discomfort for a driver and/or an occupant of the subject vehicle. Thereby, the maximum comfortable speed profile may form an upper boundary, and the minimum comfortable speed profile may form a lower boundary, of the subject vehicle speed along the route portion.

The maximum comfortable speed profile may include the maximum comfortable speed determined as suggested above. The minimum comfortable speed profile may include the minimum comfortable speed determined as suggested above. The maximum comfortable speed profile, and/or minimum comfortable speed profile, is preferably determined independently of the step of determining an efficient speed profile.

Thereby, the independently determined boundary provided by the maximum comfortable speed profile, and/or the independently determined boundary provided by the minimum comfortable speed profile, may be provided for a plurality of positions along the route portion. This further facilitates the planning of the travel of the subject vehicle through the route portion.

In addition to route data, the maximum comfortable speed profile, and/or the minimum comfortable speed profile, may be determined in dependence of data about the subject vehicle, e.g. including a mathematical model of the subject vehicle.

In some embodiments, the method comprises allowing, within an allowance time interval, or allowing, within an allowance distance travelled by the subject vehicle, the subject vehicle speed to exceed the maximum comfortable speed profile, and/or to move slower than the minimum comfortable speed profile.

The allowance time interval may be a maximum allowance time interval. The allowance time interval may be predetermined. Similarly, the allowance distance may be a maximum allowance distance. The allowance distance may be determined in dependence of the subject vehicle speed.

By allowing the subject vehicle speed to exceed the maximum comfortable speed profile, and/or to move slower than the minimum comfortable speed profile, a temporary breach of the respective boundary condition for comfort may be allowed, while the boundary condition for safety is never allowed to be breached. Such a temporary prioritization of the efficient speed over the maximum comfortable speed, and/or the minimum comfortable speed, will reduce reductions in the vehicle efficiency due to the maximum comfort speed.

The object is also reached with a computer program, or a group of computer programs, a computer readable medium, or a control unit.

The control unit may be formed by one or more hardware units. The control unit may comprise a processor and a data memory. The control unit may form a computer with computer programs for performing the steps of a method according to any embodiment of the invention.

Preferably, the control unit comprises two software modules arranged to communicate with each other, and the software modules are configured to perform the steps of a respective of determining an efficient speed and determining a maximum safe speed. As suggested, thereby, delays and bandwidth limitations in communication between hardware units may be avoided. However, in some embodiments, the control unit comprises two hardware units, arranged to communicate with each other, and the hardware units are configured to perform the steps of a respective of determining an efficient speed and determining a maximum safe speed. Regardless whether the control unit comprises software modules, or whether the control unit comprises two hardware units, the independent determination of the maximum safe speed is secured.

The object is also reached with a vehicle.

The object of the invention is also met with a method for controlling a subject vehicle, the method comprising, obtaining route data representing information about a portion of a route to be travelled by the subject vehicle, determining an efficient speed of the subject vehicle at a position along the route portion, in dependence on the route data, on a cost of operating the subject vehicle along the route portion, and on a progress of the subject vehicle along the route portion, and determining, independently of the step of determining an efficient speed, a maximum speed at said position along the route portion, in dependence on the route data, wherein the maximum speed forms an upper limit of the subject vehicle speed at said position.

The maximum speed may be a safe maximum speed determined with an aim to avoid an accident involving the subject vehicle. Alternatively, the maximum speed may be a maximum comfortable speed determined with an aim to avoid discomfort for a driver and/or an occupant of the subject vehicle. The steps of determining an efficient speed and determining a maximum speed may be performed by the use of separate respective hardware units, or by the use of separate respective software modules.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
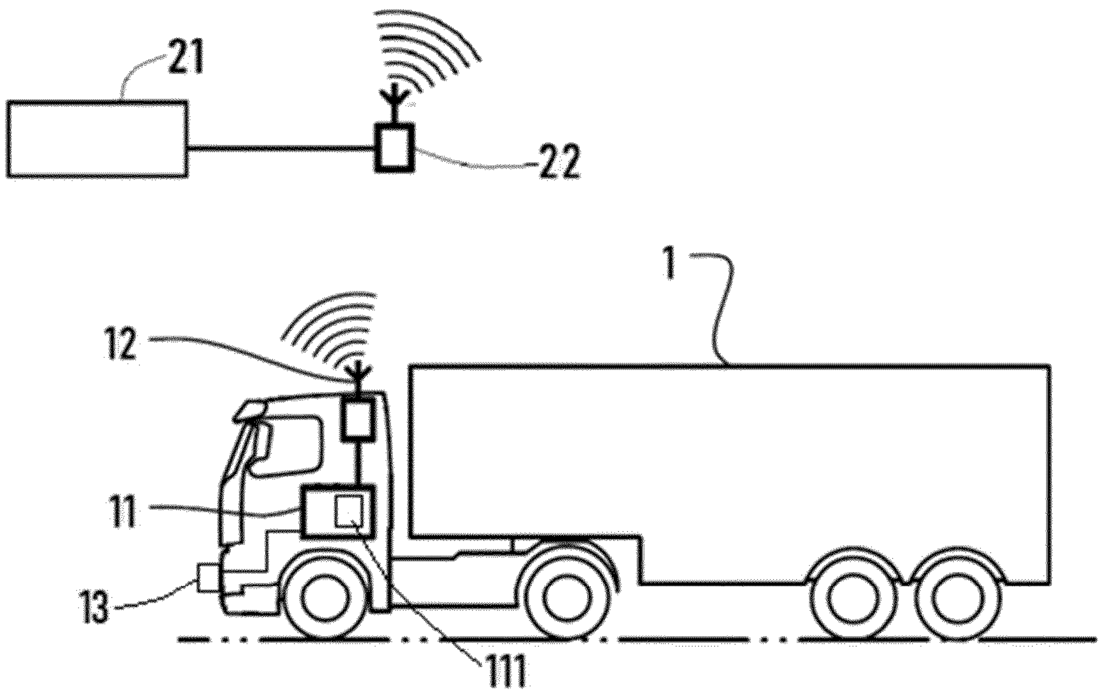
FIG. 1 is a schematic view of a vehicle and a stationary control unit.

FIG. 1 shows a vehicle 1, herein referred to as a subject vehicle. In this example, the vehicle 1 is a truck with a semitrailer. However, the invention is equally applicable to other types of vehicles, such as cars, buses, dump trucks, and mining vehicles.

The vehicle includes a powertrain. The powertrain includes a propulsion arrangement. Embodiments of the invention are applicable to a variety of propulsion arrangements. The propulsion arrangement may include an internal combustion engine. The vehicle may be arranged to be driven by an engine only. The propulsion arrangement may include an electric motor. The propulsion arrangement may be a hybrid arrangement with an engine and a motor.

The vehicle comprises a vehicle control system 11, arrange to control functions of the vehicle, such as its propulsion, and braking. The control system is arranged to control the propulsion arrangement. The control system is arranged to control a braking system of the vehicle. The vehicle control system 11 may be provided as a single physical unit, or as a plurality of physical units, e.g. a central control unit, an engine control unit, a gearbox control unit, etc., arranged to communicate with each other. In this embodiment, the vehicle control system 11 comprises a central control unit 111, herein also referred to as a vehicle control unit, or simply a control unit.

The vehicle also comprises vehicle equipment for wireless communication 12. The vehicle control unit 111 is arranged to receive data via the vehicle communication equipment 12. The vehicle has an arrangement for determining the position of the vehicle, such as equipment for the use of the Global Navigation Satellite System (GNSS).

The vehicle further comprises one or more sensors 13 for detecting objects in the surroundings of the vehicle. The one or more secondars may comprise a camera, a lidar sensor, and/or a radar sensor.

FIG. 1 also shows a stationary control unit 21. The stationary control unit 21 may be provided as a computer. The stationary control unit 21 is connected to stationary equipment for wireless communication 22. The stationary control unit 21 is arranged to send data via the stationary communication equipment 22.

Figure 2:
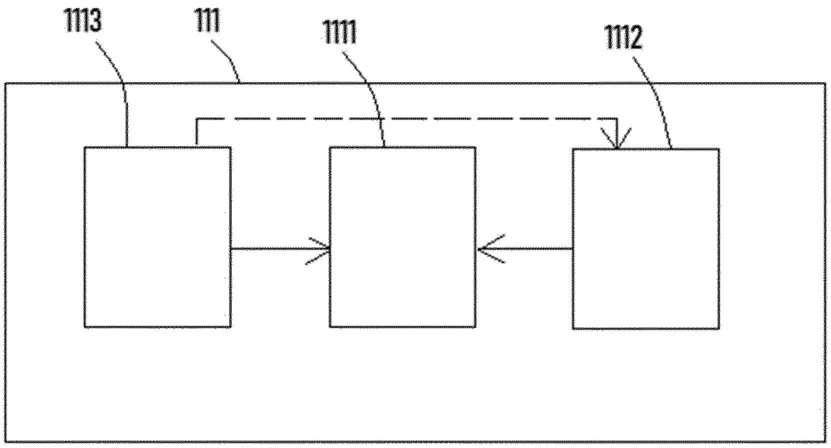
FIG. 2 is a block diagram showing parts of a control unit in the vehicle in FIG. 1.

Reference is made also to FIG. 2. The control unit 111 comprises three software modules 1111, 1112, 1113 arranged to communicate with each other. In other embodiments, the control unit comprises three hardware units, arranged to communicate with each other. More specifically, the control unit 111 comprises a central functional unit 1111, an efficient speed functional unit 1112, and a safe speed functional unit 1113.

The efficient speed functional unit 1112, and the safe speed functional unit 1113 are arranged to have access to vehicle data, e.g. including a stored mathematical model of the vehicle.

The safe speed functional unit 1113 is arranged to have receive signals from the one or more sensors 13. Such signals may represent environment data, including data representative of one or more vehicles in the vicinity of the subject vehicle, and/or data representative of terrain and/or one or more structures, e.g. buildings, at a road travelled by the vehicle.

Figure 3:
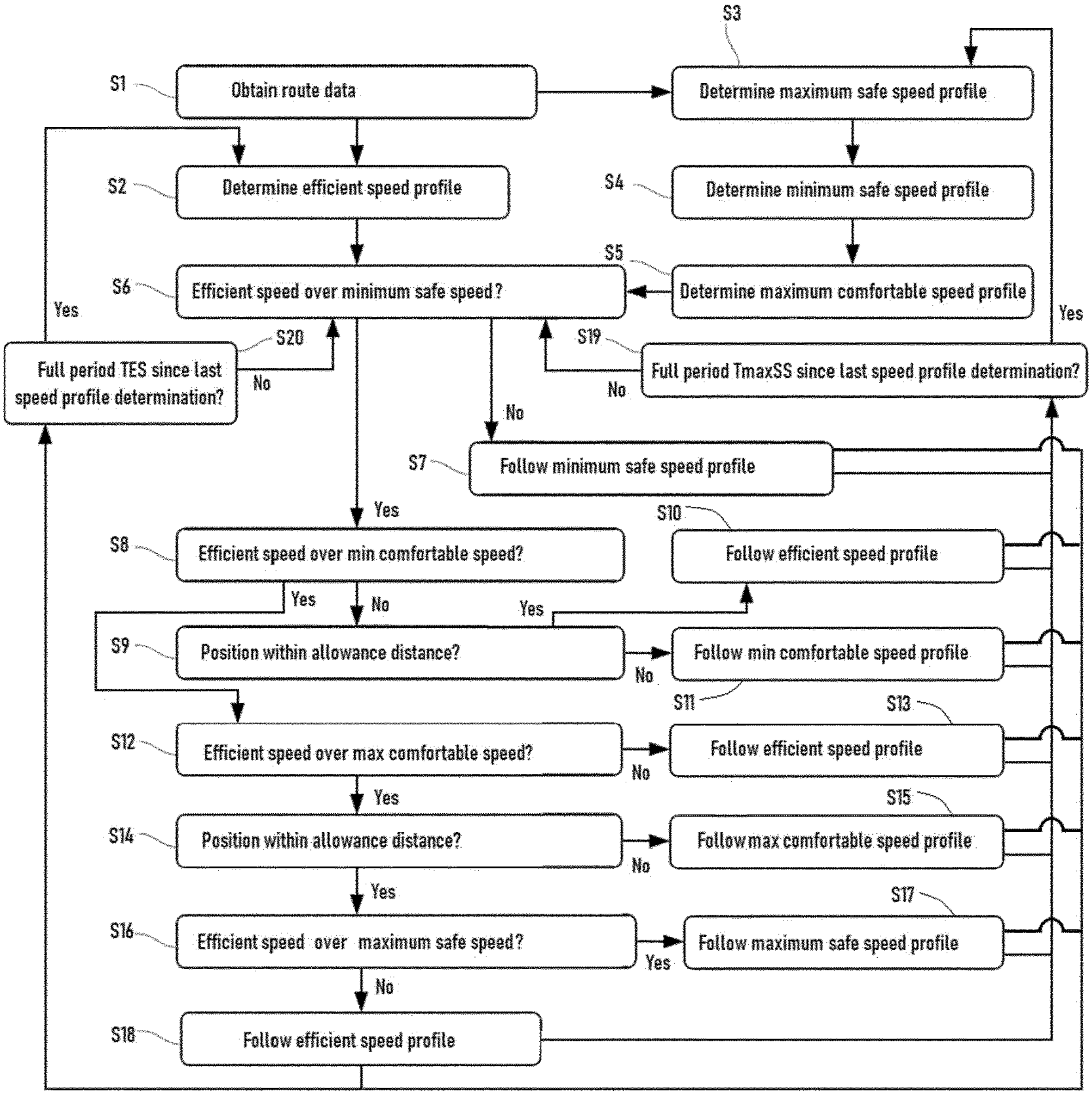
FIG. 3 is a diagram depicting steps in a method, according to an embodiment of the invention, for controlling the vehicle in FIG. 1.
Figure 4A:
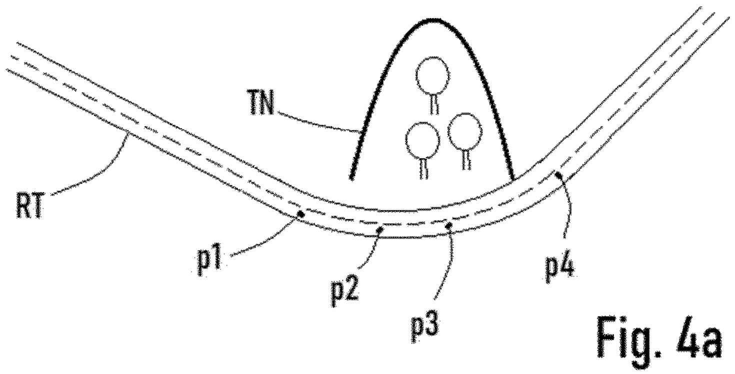
FIG. 4*a* shows schematically a portion of a route that is travelled by the vehicle in FIG. 1.
Figure 4B:
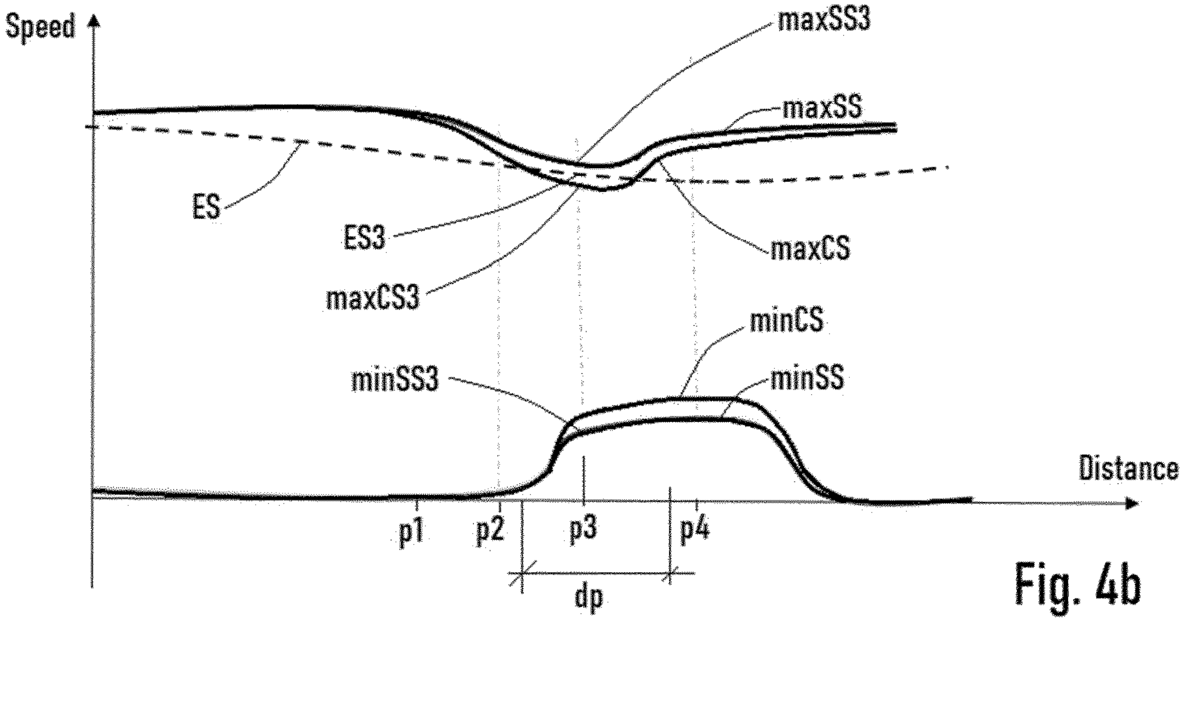
FIG. 4*b* is a graph showing speed profiles for controlling the vehicle, as it travels through the route portion in FIG. 4*a*.

Reference is made also to FIG. 3, depicting steps in a method according to an embodiment of the invention, and to FIG. 4*a* and FIG. 4*b* depicting an example of the speed control of the vehicle when travelling through a route portion.

The method comprises obtaining S1 route data representing information about a portion of a route RT to be travelled by the subject vehicle.

In FIG. 4*a* the portion of the route RT is depicted as a part of a road. The vehicle is in this example travelling from left to right on the road in FIG. 4*a*.

The route data may be received by the efficient speed functional unit 1112, as well as the safe speed functional unit 1113. The route may be chosen by a driver of the vehicle, or an automatic route finding function, in the vehicle, or in the stationary control unit 21. The route data may include data indicative of the geometry of one or more roads along the route, such as curvature and inclination. The route data may be based on map data.

The method further comprises determining S2 an efficient speed profile ES of the subject vehicle along the route portion RT. The efficient speed profile ES is determined by the efficient speed functional unit 1112. The efficient speed profile involves a plurality of efficient speeds ESi at respective positions pi along the route portion.

The efficient speed profile ES is determined in dependence on the vehicle data, the route data, on a cost of operating the subject vehicle along the route portion, and on a progress of the subject vehicle along the route portion. The cost of operating the subject vehicle may be dependent on the vehicle energy consumption and/or the vehicle deterioration. The progress of the subject vehicle may be dependent of the time consumed by the vehicle travelling through the route portion. The efficient speed profile determination may involve the use of a balancing algorithm, for balancing the operating cost and the progress.

In the example in FIG. 4*a*, the route portion includes a blind curve, in which the vision is limited due to terrain TN in the form of a hill inside the curve.

Independently of the efficient speed profile determination, the speed functional unit 1112 determines S3 a maximum safe speed profile maxSS along the route portion. The maximum safe speed profile involves a plurality of maximum safe speeds ESi at respective positions pi along the route portion. The maximum safe speed profile maxSS is determined with an aim to avoid an accident involving the subject vehicle. Such an accident may be that the subject vehicle overturns. In the example in FIGS. 4*a* and 4*b*, it can be seen that maximum safe speed starts being reduced at a first position p1, at some distance before the curve.

Also, independently of the efficient speed profile determination, the speed functional unit 1112 determines S4 a minimum safe speed profile minSS along the route portion. The minimum safe speed profile involves a plurality of minimum safe speeds minSSi at the respective positions pi along the route portion. Also the minimum safe speed profile minSS is determined with an aim to avoid an accident involving the subject vehicle. Such an accident may be that the subject vehicle it hit by another vehicle due to the limited vision in the blind curve of the route portion RT.

In the example in FIGS. 4*a* and 4*b*, it can be seen that the minimum safe speed starts increasing from zero at a second position p2, in the curve. The maximum safe speed remains positive past third and fourth positions p3, p4, which cannot be seen from far from the left in the figure, due to the hill TN.

The maximum safe speed profile maxSS, and the minimum safe speed profile minSS, are determined in dependence on the vehicle data, the route data, and the environment data.

In addition, independently of the efficient speed profile determination, the speed functional unit 1112 determines S5 a maximum comfortable speed profile maxCS along the route portion. The maximum comfortable speed profile maxCS involves a plurality of maximum comfortable speeds maxCSi at the respective positions pi along the route portion. The maximum comfortable speed profile maxCS is determined with an aim to avoid discomfort for a driver and/or an occupant of the subject vehicle. The maximum comfortable speed profile maxCS is determined in dependence on the vehicle data, the route data, and the environment data.

In the example in FIG. 4*a* and FIG. 4*b*, in some positions the maximum comfortable speed profile maxCS coincides with the maximum safe speed profile maxSS, and at other portions, the maximum comfortable speed profile maxCS is below the maximum safe speed profile maxSS. The maximum comfortable speed profile maxCS coincides with the maximum safe speed profile maxSS in most of the straight parts of the route portions, but is lower than the maximum safe speed profile maxSS in the curve.

The method may also comprise the speed functional unit 1112 determining, independently of the efficient speed profile determination, a minimum comfortable speed profile minCS along the route portion. The minimum comfortable speed profile may involve a plurality of minimum comfortable speeds at the respective positions along the route portion. The minimum comfortable speed profile may be determined with an aim to avoid discomfort for the driver and/or an occupant of the subject vehicle. The minimum comfortable speed profile may be determined in dependence on the vehicle data, the route data, and the environment data.

The efficient speed profile ES, the maximum safe speed profile maxSS, the minimum safe speed profile minSS, and the maximum comfortable speed profile maxCS are transferred to the central functional unit 1111. Thereby, the central functional unit 1111 controls the subject vehicle in dependence on the speed profiles. Thereby, the subject vehicle is controlled to follow the efficient speed profile ES through the portion of the route RT, if conditions for this are met as exemplified below.

The maximum safe speed profile maxSS forms an upper boundary of the subject vehicle speed along the route portion. Thereby, the vehicle will be controlled so as for the speed to not exceed the maximum safe speed at any position along the route portion. This is true even in cases where the efficient speed is higher than the maximum safe speed.

The minimum safe speed profile minSS forms a lower boundary of the subject vehicle speed along the route portion. Thereby, the vehicle will be controlled so as for the vehicle speed to not be lower than the minimum safe speed at any position along the route portion. This is true even in cases where the efficient speed is lower than the minimum safe speed.

Further, the maximum comfortable speed profile maxCS forms an upper boundary of the subject vehicle speed along the route portion. However, the subject vehicle will be allowed, within an allowance distance travelled by the subject vehicle, to travel at a speed exceeding the maximum comfortable speed profile maxCS.

In the example in FIG. 4*a* and FIG. 4*b*, the subject vehicle is at the third position p3 within such an allowance distance dp. Thereby, the vehicle is allowed to travel at the efficient speed ES3, which is above the maximum comfortable speed maxCS3, and below the maximum safe speed maxSS3.

Nevertheless, even if it is allowed to temporarily exceed the maximum comfortable speed profile maxCS, the vehicle will be controlled so as for the speed to not exceed the maximum safe speed at any position along the route portion.

As depicted in FIG. 3, in this example, the method comprises determining S6 whether the efficient speed at a position along the route is over the minimum safe speed. If the efficient speed is under the minimum safe speed, the vehicle is controlled to follow S7 the minimum safe speed profile.

If the efficient speed is over the minimum safe speed, it is determined S8 whether the efficient speed at the position is over the minimum comfortable speed. If the efficient speed is under the minimum comfortable speed, it is determined S9 whether the vehicle is within an allowance distance dp within which the vehicle may move under the minimum comfortable speed. If the vehicle is within the allowance distance dp, the vehicle is controlled to follow S10 the efficient speed profile. If the vehicle has passed the allowance distance dp, the vehicle is controlled to follow S11 the minimum comfortable speed profile.

If the efficient speed is over the minimum comfortable speed, it is determined S12 whether the efficient speed at the position is over the maximum comfortable speed. If the efficient speed is under the maximum comfortable speed, the vehicle is controlled to follow S13 the efficient speed profile.

If the efficient speed is over the maximum comfortable speed, it is determined S14 whether the vehicle is within an allowance distance dp within which the maximum comfortable speed may be exceeded. If the vehicle has passed the allowance distance dp, the vehicle is controlled to follow S15 the maximum comfortable speed profile.

If the vehicle is within the allowance distance dp, it is determined S16 whether the efficient speed at the position is over the maximum safe speed. If the efficient speed is over the maximum safe speed, the vehicle is controlled to follow S17 the maximum safe speed profile. If the efficient speed is under the maximum safe speed, the vehicle is controlled to follow S18 the efficient speed profile.

As suggested in FIG. 3, the method comprises repeating at regular time intervals the determination of the maximum safe speed profile, the minimum safe speed profile, and the comfortable speed profile. Thereby, changes, e.g. in the environmental data, may be taken into consideration.

In this embodiment, the determinations of the speed profiles are regularly repeated as the subject vehicle moves along the route RT. Thereby, they can be updated, e.g. in view of changing environmental data.

The determination of the maximum safe speed profile maxSS is repeated with a maximum safe speed profile update period TmaxSS. In this example, the minimum safe speed profile minSS, and the maximum comfortable speed profile maxCS, are updated with the same period TmaxSS.

Further, in this example, it is determined S19 whether a full maximum safe speed profile update period TmaxSS has passed since the last maximum safe speed profile determination S3. If a full period TmaxSS has not passed since the last maximum safe speed profile determination, the step of determining S6 whether the efficient speed is over the minimum safe speed is executed without any update of the maximum safe speed profile, the minimum safe speed profile, or the comfortable speed profile. If a full period TmaxSS has passed since the last maximum safe speed profile determination, the step of determining S3 a maximum safe speed profile is repeated.

The determination of the efficient speed profile ES is repeated with an efficient speed profile update period TES. In this example, the efficient speed profile is longer than the maximum safe speed profile update period TmaxSS.

In this example, it is determined S20 whether a full efficient speed profile update period TES has passed since the last efficient speed profile determination S2. If a full period TES has not passed since the last efficient speed profile determination, the step of determining S6 whether the efficient speed is over the minimum safe speed is executed without any update of the efficient speed profile. If a full period TES has passed since the last efficient speed profile determination, the step of determining S2 an efficient speed profile is repeated.

Figure 5:
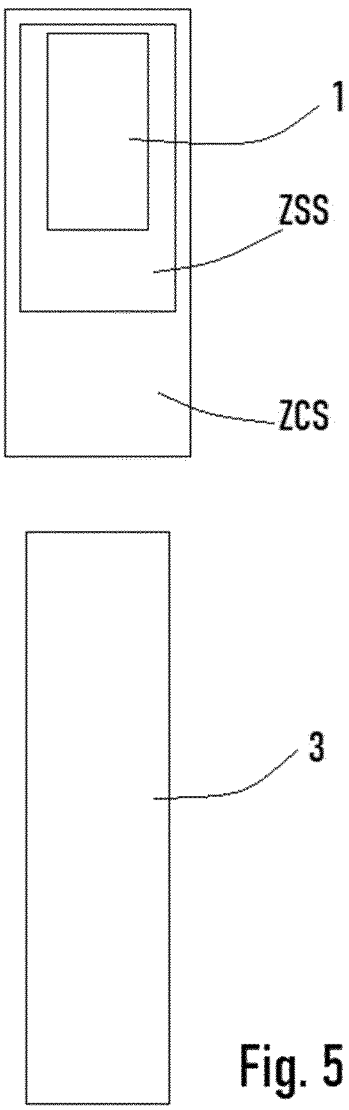
FIG. 5 shows schematically the vehicle in FIG. 1 from above, with another vehicle travelling in front of the vehicle in FIG. 1.
Figure 6:
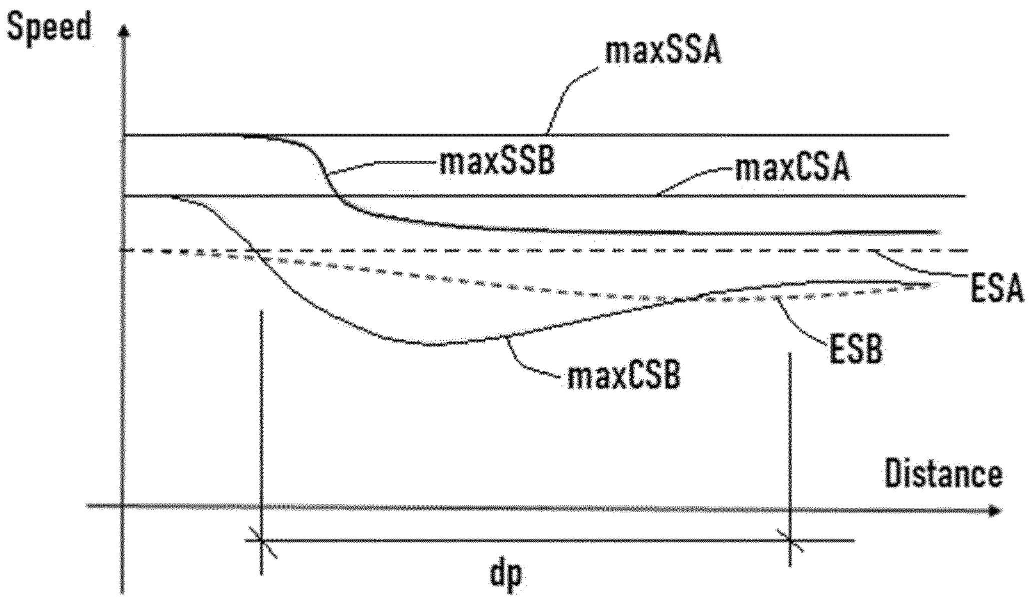
FIG. 6 is a graph showing speed profiles for controlling the vehicle, as it travels behind the other vehicle in FIG. 5.

Reference is made also to FIG. 5 and FIG. 6. In FIG. 5, the subject vehicle 1 is depicted from above, travelling behind another vehicle 3. In this example, the road is straight.

Thereby, as depicted in FIG. 6, the subject vehicle is controlled with a first efficient speed profile ESA, a first maximum safe speed profile maxSSA, and a first maximum comfortable speed profile maxCSA. The first maximum safe speed profile maxSSA, and the first maximum comfortable speed profile maxCSA are determined in dependence on environmental data including data from the one or more sensors of the subject vehicle indicating the distance to vehicle 3 in front of the subject vehicle 1.

As depicted in FIG. 5, the first maximum safe speed profile maxSSA, and the first maximum comfortable speed profile maxCSA, creates respective zones ZSS, ZCS behind the other vehicle 3. The first maximum safe speed profile maxSSA prevents the subject vehicle 1 to enter a safe speed zone ZSS. The subject vehicle 1 is never allowed into the safe speed zone ZSS.

The first maximum comfortable speed profile maxCSA prevents the subject vehicle 1 to enter a comfortable speed zone ZCS. However, similarly to what was suggested above, the subject vehicle 1 is allowed into the comfortable speed zone ZCS, within an allowance time interval, or within an allowance distance travelled by the subject vehicle. Thereby, the subject vehicle speed may exceed the maximum comfortable speed profile within the allowance time interval, or within the allowance distance.

As suggested above, the maximum safe speed profile, and the maximum comfortable speed profile are repetitively updated. Thereby, they may be adapted to changing environmental data.

In the example in FIG. 6, the environmental data is changed by the vehicle 3 in front of the subject vehicle 1 slowing down. Thereby, the first efficient speed profile ESA, the first maximum safe speed profile maxSSA, and the first maximum comfortable speed profile maxCSA, are replaced by a second efficient speed profile ESB, a second maximum safe speed profile maxSSB, and a second maximum comfortable speed profile maxCSB, respectively.

Thereby, the subject vehicle is allowed to follow the second efficient speed profile ESB, above the second maximum comfortable speed profile maxCSB, within the allowance distance dp travelled by the subject vehicle.

It should be noted that alternatives are possible. For example, as suggested with the broken line in FIG. 2, the maximum safe speed profile maxSS, determined by the speed functional unit 1112, may be sent to the efficient speed functional unit 1112. Thereby, the efficient speed profile ES may be determined in dependence on the maximum safe speed profile maxSS. Nevertheless, the maximum safe speed profile maxSS is determined independently of the efficient speed profile determination.

Figure 7:
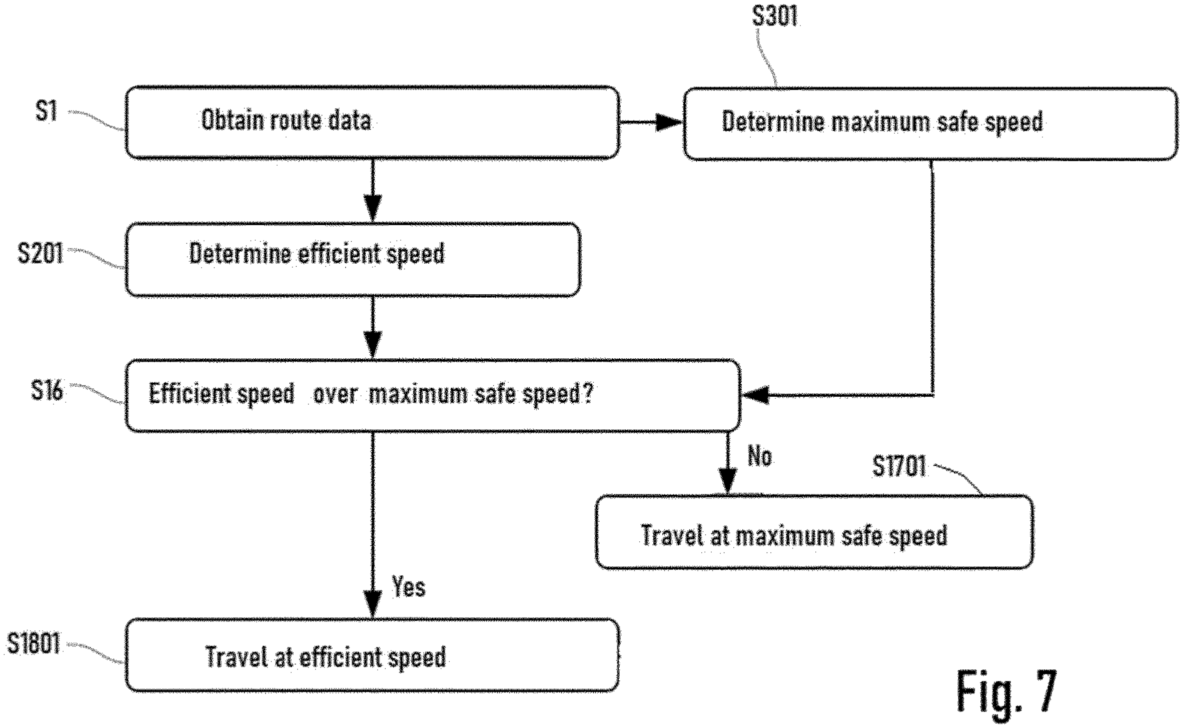
FIG. 7 is a flow diagram depicting steps in a method according to a more general embodiment of the invention.

Reference is made to FIG. 7, depicting steps in a method controlling a subject vehicle, according to a more general embodiment of the invention.

The method comprises obtaining S1 route data representing information about a portion of a route to be travelled by the subject vehicle. The method further comprises determining S201 an efficient speed ESi of the subject vehicle at a position along the route portion, in dependence on the route data, on a cost of operating the subject vehicle along the route portion, and on a progress of the subject vehicle along the route portion. The method further comprises determining S301, independently of the step of determining an efficient speed ESi, a maximum safe speed maxSSi at said position along the route portion, in dependence on the route data, with an aim to avoid an accident involving the subject vehicle.

The maximum safe speed maxSSi forms an upper limit of the subject vehicle speed at said position. Thereby, it is determined S16 whether at the position the efficient speed is over the maximum safe speed. If it is determined that at the position the efficient speed is over the maximum safe speed, the vehicle is controlled S1701 to run at the maximum safe speed at the position. If it is determined that at the position the efficient speed is under the maximum safe speed, the vehicle is controlled S1801 to run at the efficient speed at the position.

It is to be understood that the present invention is not limited to the embodiments described above and illustrated in the drawings; rather, the skilled person will recognize that many changes and modifications may be made within the scope of the appended claims.

The invention claimed is:

1. A computer-implemented method for controlling a subject vehicle, the method comprising:

obtaining route data representing information about a portion of a route (RT) to be travelled by the subject vehicle, wherein the route data includes data representing information about one or more of curvatures and inclinations of the route portion;

determining an efficient speed (ESi) of the subject vehicle at a position (pi) along the route portion, in dependence on the route data, on a cost of operating the subject vehicle along the route portion, and on a progress of the subject vehicle along the route portion, determining, independently of the step of determining an efficient speed (ESi), a maximum safe speed (maxSSi) at the position (pi) along the route portion, in dependence on the route data and environment data, with an aim to avoid an accident involving the subject vehicle, the environment data including at least one of additional vehicles on the route portion, terrain (TN), or one or more structures at the route portion;

repeating the determining of the maximum safe speed (maxSSi) as the subject vehicle moves along the route (RT) with a maximum safe speed update period (TmaxSS);

repeating the determining of the efficient speed (ESi) as the subject vehicle moves along the route (RT) with an efficient speed update period (TES), wherein the efficient speed update period (TES) is longer than the maximum safe speed update period (TmaxSS);

determining whether the maximum safe speed update period (TmaxSS) has passed since a last determination of the maximum safe speed (maxSSi), and, if the maximum safe speed update period (TmaxSS) has not passed since the last determination of the maximum safe speed (maxSSi), determining whether the efficient speed is over the maximum safe speed without any update of the maximum safe speed;

determining whether the efficient speed update period (TES) has passed since a last determination of the efficient speed (ESi), and, if the efficient speed update period (TES) has not passed since the last determination of the efficient speed (ESi), determining whether the efficient speed is over the maximum safe speed without any update of the efficient speed (ESi); and controlling the subject vehicle according to the maximum safe speed (maxSSi) forming an upper limit of the subject vehicle speed at the position (pi).

2. The method of claim 1, wherein the steps of determining an efficient speed (ESi) and determining a maximum safe speed (maxSSi) are performed by the use of separate respective hardware units, or by the use of separate respective software modules.

3. The method of claim 1, wherein the step of determining a maximum safe speed (maxSSi) is repeated as the subject vehicle moves along the route (RT).

4. The method of claim 1, further comprising determining, independently of the step of determining an efficient speed (ESi), a minimum safe speed (minSSi) at the position (pi)

along the route portion, in dependence on the route data, with an aim to avoid an accident involving the subject vehicle, wherein the minimum safe speed (minSSi) forms a lower limit of the subject vehicle speed at the position (pi).

5. The method of claim 1, further comprising determining, independently of the step of determining an efficient speed (ESi), a maximum comfortable speed (maxCSi), and/or a minimum comfortable speed (min CSi), at the position (pi) along the route portion, in dependence on the route data, with an aim to avoid discomfort for a driver and/or an occupant of the subject vehicle, wherein the maximum comfortable speed (maxCSi) forms an upper limit of the subject vehicle speed at the position (pi), and the minimum comfortable speed (min CSi) forms a lower limit of the subject vehicle speed at the position (pi).

6. The method of claim 5, further comprising receiving interface data from a human machine interface device, representative of one or more requests from a driver and/or an occupant of the subject vehicle, wherein the maximum comfortable speed (maxCSi), and/or the minimum comfortable speed (minCSi), is determined in dependence on the interface data.

7. The method of claim 5, wherein the steps of determining an efficient speed (ESi) and determining a maximum comfortable speed (maxCSi) and/or a minimum comfortable speed (minCSi), are performed by the use of separate respective hardware units, or by the use of separate respective software modules.

8. The method of claim 5, wherein the maximum comfortable speed (maxCSi), and/or the minimum comfortable speed (minCSi), is determined in dependence on environment data, including data representative of one or more additional vehicles on the route portion, and/or data representative of terrain (TN) and/or one or more structures at the route portion.

9. The method of claim 5, wherein the step of determining a maximum comfortable speed (maxCSi), and/or a minimum comfortable speed (minCSi), is repeated as the subject vehicle moves along the route (RT).

10. The method of claim 1, further comprising determining an efficient speed profile (ES), including the efficient speed (ESi), of the subject vehicle along the route portion, in dependence on the route data, on a cost of operating the subject vehicle along the route portion, and on a progress of the subject vehicle along the route portion.

11. The method of claim 1, further comprising determining a maximum safe speed profile (maxSS), including the maximum safe speed (maxSSi), along the route portion, in dependence on the route data, with an aim to avoid an accident involving the subject vehicle, wherein the maximum safe speed profile (maxSS) forms an upper boundary of the subject vehicle speed along the route portion and wherein the maximum safe speed profile (maxSS) involves a plurality of maximum safe speeds (maxSSi) at respective positions (pi) along the route portion.

12. The method of claim 10, wherein a maximum safe speed profile (maxSS) is determined independently of the step of determining an efficient speed profile (ES).

13. The method of claim 1, further comprising determining a maximum comfortable speed profile (maxCS) and/or a minimum comfortable speed profile (minCS), along the route portion, in dependence on the route data, with an aim to avoid discomfort for a driver and/or an occupant of the subject vehicle, wherein the maximum comfortable speed profile (maxCS) forms an upper boundary of the subject vehicle speed along the route portion, and the minimum comfortable speed profile (minCS) forms a lower boundary of the subject vehicle speed along the route portion.

14. The method of claim 10, wherein a maximum comfortable speed profile (maxCS), and/or the minimum comfortable speed profile (minCS), is determined independently of the step of determining an efficient speed profile (ES).

15. The method of claim 13, further comprising allowing, within an allowance time interval, or allowing, within an allowance distance (dp) travelled by the subject vehicle, the subject vehicle speed to exceed the maximum comfortable speed profile (maxCS), and/or to move slower than the minimum comfortable speed profile (minCS).

16. A non-transitory computer readable medium carrying a computer program, or a group of computer programs, comprising program code means for performing the steps of claim 1 when the program product is run on a computer, or a group of computers.

17. A control unit configured to perform the steps of the method of claim 1.

18. The control unit of claim 17, wherein the control unit comprises two software modules arranged to communicate with each other, and the software modules are configured to perform the steps of a respective of determining an efficient speed (ESi) and determining a maximum safe speed (maxSSi).

19. The control unit of claim 17, wherein the control unit comprises two hardware units, arranged to communicate with each other, and the hardware units are configured to perform the steps of a respective of determining an efficient speed (ESi) and determining a maximum safe speed (maxSSi).

20. A vehicle comprising the control unit of claim 17.

* * * * *